(12) United States Patent
Dietrich et al.

(10) Patent No.: US 9,491,172 B2
(45) Date of Patent: Nov. 8, 2016

(54) METHOD FOR COMMUNICATION OF ENERGY CONSUMPTION-SPECIFIC MEASUREMENT DATA ELEMENTS BETWEEN A SMART METER DEVICE AND A COMPUTER SYSTEM OF A UTILITY COMPANY AND/OR OPERATOR OF A MEASURING SYSTEM

(71) Applicant: BUNDESDRUCKEREI GMBH, Berlin (DE)

(72) Inventors: Frank Dietrich, Berlin (DE); Manfred Paeschke, Wandlitz (DE)

(73) Assignee: BUNDESDRUCKEREI GMBH, Berlin (GB)

( * ) Notice: Subject to any disclaimer, the term of this patent is extended or adjusted under 35 U.S.C. 154(b) by 148 days.

(21) Appl. No.: 14/376,667

(22) PCT Filed: Jan. 18, 2013

(86) PCT No.: PCT/EP2013/050908
§ 371 (c)(1),
(2) Date: Aug. 5, 2014

(87) PCT Pub. No.: WO2013/117408
PCT Pub. Date: Aug. 15, 2013

(65) Prior Publication Data
US 2014/0375474 A1 Dec. 25, 2014

(30) Foreign Application Priority Data

Feb. 7, 2012 (DE) .......................... 10 2012 201 810
Mar. 6, 2012 (DE) .......................... 10 2012 203 518

(51) Int. Cl.
*H04L 29/06* (2006.01)
*G06F 21/44* (2013.01)
(Continued)

(52) U.S. Cl.
CPC ........... *H04L 63/0869* (2013.01); *G01D 4/002* (2013.01); *G06F 21/44* (2013.01);
(Continued)

(58) Field of Classification Search
CPC ........... H04L 63/0869; H04L 63/0823; H04L 9/3263; H04L 9/3273; H04W 4/20; G01D 4/002; G06F 21/57
See application file for complete search history.

(56) References Cited

U.S. PATENT DOCUMENTS 4,132,981 A    1/1979   White
2011/0267202 A1*   11/2011   Efthymiou ............. G01D 4/004
                                                                   340/870.03

(Continued)

OTHER PUBLICATIONS

Barriga et al., "M2M Remote-Subscription Management", www.ericsson.com, XP002686983, May 2, 2011.
(Continued)

*Primary Examiner* — Leon Flores
(74) *Attorney, Agent, or Firm* — Leveque Intellectual Property Law, P.C.

(57) ABSTRACT

A method for communicating energy consumption-specific measurement data elements recorded by a smart meter between a smart meter device and a first computer system of a utility company and/or operator of a measuring system, the device having a security module, said security module serving as the sole communication interface between of the device with the first computer system, the device having configuration data required for its operation, and the device being associated with an indication of those measurement data elements and/or configuration data for which the first computer system has a read access authorization, the method comprising: establishing a first communication channel between the first computer system and the security module, mutually authenticating the computer system and the security module, authentication being carried out with the aid of a first certificate of the security module and a second certificate of the first computer system; once mutual authentication has been completed, transmitting via the security module at least a part of the measurement data elements and/or configuration data specified in the indication to the first computer system by a secured transmission.

18 Claims, 3 Drawing Sheets

(51) Int. Cl.
| | |
|---|---|
| G06F 21/57 | (2013.01) |
| G06F 21/60 | (2013.01) |
| H04W 4/20 | (2009.01) |
| G01D 4/00 | (2006.01) |
| H04L 9/32 | (2006.01) |
| H04W 4/00 | (2009.01) |

(52) U.S. Cl.
CPC ............ G06F 21/57 (2013.01); G06F 21/606 (2013.01); H04L 9/3263 (2013.01); H04L 9/3273 (2013.01); H04L 63/0823 (2013.01); H04W 4/20 (2013.01); *G06F 2221/2141* (2013.01); *H04W 4/005* (2013.01); *Y04S 40/24* (2013.01)

(56) References Cited

U.S. PATENT DOCUMENTS

2013/0081113 A1\* 3/2013 Cherian ................ G06F 15/177 726/4
2014/0225742 A1\* 8/2014 Wenger ................. G01D 4/002 340/870.02

OTHER PUBLICATIONS

"3rd Generation Partnership Project: Technical Specification Group Services and System Aspects: Feasibility Study on the Security Aspects of Remote Provisioning and Change of Subscription for Machine to Machine Equipment (Release 9)", 3GPP Standard, v9.2.0, XP050441986, Jun. 22, 2010.
"ETSI TS 102 689 Machine to Machine Communications—M2M Service Requirements", www.etsi.org, V1.1.1, XP055058237, Aug. 3, 2010.
"ETSI TS 102 690 Machine to Machine Communications—Functional Architecture", www.etsi.org, V1.1.1, XP055057930, Oct. 1, 2011.
"ETSI TS 102 691 Machine to Machine Communications—Smart Metering Use Cases", www.etsi.org, V1.1.1, XP055058238, May 18, 2010.
PCT International Preliminary Report on Patentability, PCT/EP2013/050908, Aug. 21, 2014.
European Patent Office, International Search Report, PCT/EP2013/050908, Apr. 26, 2013.
"Technische Richtlinie BSI TR-03109 Version 0.20", www.internet-sicherheit.de, XP055059493, Oct. 10, 2011—English text attached.
"Technische Richtlinie BSI TR-03109 Appendix A", www.internet-sicherheit.de, XP055059483, Oct. 10, 2011—English text attached.
"Technische Richtlinie BSI TR-03109 Appendix B", www.internet-sicherheit.de, XP055059481, Nov. 24, 2011—English text not available.
"Technische Richtlinie BSI TR-03109 Appendix C", www.internet-sicherheit.de, XP055059491, Oct. 10, 2011—English text attached.
"Protection Profile for the Gateway of a Smart Metering Ssytem", www.bsi.bund.de, XP055059496, Aug. 26, 2011.

\* cited by examiner

METHOD FOR COMMUNICATION OF ENERGY CONSUMPTION-SPECIFIC MEASUREMENT DATA ELEMENTS BETWEEN A SMART METER DEVICE AND A COMPUTER SYSTEM OF A UTILITY COMPANY AND/OR OPERATOR OF A MEASURING SYSTEM

PRIORITY CLAIM

This application claims benefit of foreign priority in accordance with 35 U.S.C. 119(b) to German application No. 10 2012 201 810.7 filed Feb. 2, 2012 and German application No. 10 2012 203 518.4 filed Mar. 6, 2012.

CROSS REFERENCE TO RELATED APPLICATIONS

This application is related to the following co-pending U.S. patent applications: application Ser. No. 14/376,660, entitled "A METHOD FOR INITIALIZING A MEMORY AREA THAT IS ASSOCIATED WITH A SMART METER", filed on even date herewith, which is incorporated herein in its entirety.

BACKGROUND

The term "smart metering" is generally understood to mean the concept of equipping customers with electronic energy consumption recording equipment in order thus to provide additional functionalities both to the customer and to the utility company, for example via a network, besides a simple recording of the amount of energy that has been consumed.

With this, it is possible that the customer can be informed in real time about his current energy consumption. The term "energy consumption" is understood here to mean the consumption by the customer in relation to any type of energy which is supplied to households and companies. This includes, besides the energy forms of electricity, water and gas, also any other forms of energy, such as district heating for example.

In order to record the energy consumption, intelligent metering systems, also called intelligent meters or "smart meters", are used at the premises of the consumer in question. Smart meters meter the energy that is consumed. The consumer may in this case be a natural or legal person that consumes various measurable forms of energy, such as electricity, gas, water or heat. The aim of using smart meters is to implement intelligent metering systems which would make it possible for example to levy variable charges depending on the overall demand and network load. As a result, energy supply networks can be better utilized on the whole.

From the BSI [German Federal Office for Information Security] technical guideline TR-03109, it is known to provide a so-called smart meter gateway, also known as a concentrator, as a central communication unit which can communicate with one or more smart meters. To this end, the gateway is able to communicate with equipment in the so-called "Home Area Network" and with equipment in the "Wide Area Network". The Home Area Network includes all smart meters which are coupled to the gateway, as well as, for example, private computing units of the consumers. The private computing units may be used for example to provide information about current energy consumption values recorded by the smart meters. The Wide Area Network is designed to enable communication between the gateway and authorized market operators. By way of example, the gateway can collect the data from all the smart meters and can provide said data to a superordinate collecting point, for example a utility company or a metering point operator.

BRIEF DESCRIPTION OF THE DRAWINGS

Preferred embodiments of the invention will be explained in more detail below with reference to the drawings, in which.

DESCRIPTION

The problem addressed by the invention is that of providing a method for communicating energy consumption-specific measurement data elements from a smart meter device to a computer system of a utility company and/or metering point operator, as well as a computer program product.

The invention relates to a method for communicating energy consumption-specific measurement data elements from a smart meter device to a computer system of a utility company and/or metering point operator, and to a computer program product.

There is proposed a method for communicating energy consumption-specific measurement data elements recorded by a smart meter from a smart meter device to a first computer system of a utility company and/or metering point operator, wherein the device has a security module, wherein the security module serves as the sole communication interface between the device and the first computer system, wherein the device has configuration data necessary for its operation, wherein the device is assigned a statement of those measurement data elements and/or configuration data for which the first computer system has a read access authorization. The method comprises firstly establishing a first communication channel between the first computer system and the security module. This is followed by a preferably direct mutual authentication of the computer system and the security module, wherein the authentication takes place with the aid of a first certificate of the security module and with the aid of a second certificate of the first computer system. The term "direct mutual authentication" is understood here to mean that a second computer system need not be involved in this for example in order to carry out authentication measures as a mediating means between the security module and the first computer system. In particular, this rules out the situation whereby the first computer system and/or the security module requires a second computer system in order to be able to carry out any authentication measures at all. A second computer system is thus not necessary in order to check the authenticity of certificates or of communication rights or to carry out identity checks.

After successful mutual authentication, at least a portion of the measurement data elements and/or configuration data specified in the statement is transmitted to the first computer system, via the security module, by a secure transmission.

Configuration data are understood here to mean any types of data which configure the operation of the device or of the smart meters assigned to the device. This also includes the configuration of the way in which energy measurement data is acquired by means of the measurement data elements, such as for example the timing of measurement data acquisition, measurement data evaluation, measurement data aggregation, measurement data conversion, as well as location-specific data for the device or the smart meters assigned to the device.

"Measurement data elements" are understood to mean any type of data which result from an energy consumption measurement by a smart meter. This includes for example a time of acquisition of measurement data of the energy consumption measurement, individual measurement data points at the time in question, and information about the occurrence of the measurement data, such as for example current intensity, voltage, water pressure, water temperature or gas pressure.

Embodiments of the invention may have the advantage that, by providing the described authorization concept in the form of the statements specific to each utility company and/or metering point operator, it is possible to define in advance which measurement data elements and/or configuration data is allowed to be read or recorded by said utility company and/or metering point operator. A high degree of data protection is ensured as a result.

According to one embodiment of the invention, the device has a memory area, wherein a first part of the statement is stored in the memory area.

According to one embodiment of the invention, the method further comprises the establishment of a second communication channel between a second computer system and the security module, wherein the first computer system and the second computer system are assigned to a set of computer systems connected via a network. This is followed by an authentication of the second computer system with respect to the security module, wherein the initialization serves to enable a communication of the security module with the first computer system, wherein, prior to the initialization of the memory area, a successful authentication with respect to the security module is possible only for the second computer system of the set of computer systems.

After successful authentication of the second computer system with respect to the security module, data are received from the second computer system by the security module through a secure transmission and the data are stored in the memory area in order to initialize the memory area, wherein the communication between the first computer system and the security module while bypassing the second computer system is enabled only as a result of the stored data. Prior to this, a communication of the security module and thus of the device with the first computer system is not possible at all, either directly or indirectly.

Embodiments of the invention could have the advantage that, due to the initialization process, it is possible to provide in a reliable, clear and comprehensible manner a possibility which enables a secure communication between the smart meter and an authorized market operator, such as a utility company or a metering point operator. Preferably, the second computer system is a computer system of a trustworthy instance, which is also referred to as the "Trusted Service Manager" or "TSM".

To this end, the security module is preferably configured for example in its delivery state such that only this trustworthy instance is able to carry out a communication with the security module after successful authentication. This ensures that in particular a charge-related configuration of the smart metering is entrusted only to such an authority that is deemed to be trustworthy both by the authorized market operators, that is to say for example the metering point operators and/or the actual utility companies, and the end consumers. "Charge-related configuration" will be understood below to mean that this configuration in relation to a smart meter serves to define who for example is authorized to bill for the amounts of energy recorded by the smart meter. Furthermore, it can also be used to define which persons such as end consumers and authorized market operators should have access at all, and to what extent, to the functions and information available in relation to the smart meter. Since this definition takes place by a trustworthy authority, it is ensured that misuse of these functions and of this information by unauthorized third parties is ruled out. The information may comprise for example information regarding the location of the smart meter, values measured by the smart meter, information regarding the location of the memory area or any values contained in the memory area.

By storing the received data in a memory area in order to initialize the memory area, it is thus possible for example to define, for one or more smart meters which are assigned to this memory area and to which for example recorded amounts of energy are reported, how the amounts of energy are to be recorded over time and which information or "attributes" an authorized market operator may record and/or request from the smart meter. It is also possible to define the extent to which an end consumer for example has access to the information that is stored in relation to the smart meter either in the smart meter itself or on a device assigned to the smart meter or on the security module.

Embodiments of the invention are therefore particularly advantageous on the whole since a particularly high degree of trustworthiness is ensured in terms of the data "configuration data" stored in relation to the device and in terms of the data protection of the measurement data elements recorded by the smart meters assigned to the device, both for end consumers and for metering point operators and utility companies.

Said method ensures that measurement data elements and/or configuration data are transmitted between the second computer system of the utility company or metering point operator and the security module only when both the utility company or metering point operator and the end consumer are interested in the first place in such a data transmission and when both sides have previously consented to such a data transmission. Only then will said memory area be provided with the authorization statements for the first computer system by the trustworthy instance. Since the instance of the second computer system is certainly trustworthy, end consumers can assume that no undesired enabling of first computer systems by corresponding storage of said statements in the memory area takes place for their device without consent.

It should be noted that, within the context of the description as a whole, preferably all certificates should be issued by the operator of the second computer system. This also guarantees the security of the trustworthiness both of the first and second computer system and of the security module.

According to one embodiment of the invention, the stored data comprise the first part of the statement. An acceptance of a data protection concept described above is thus obtained in particular as a result of the fact that the access authorization, that is to say the statement, is authorized by the trustworthy authority, namely the second computer system.

According to one embodiment of the invention, the secure transmission takes place through an end-to-end encryption between the second computer system and the security module. This makes it possible to establish the link between the security module and the second computer system via any networks since, due to the end-to-end encryption, no changes to the data transmitted via the link can be made by third parties. In general, the invention can be implemented in that the entire communication between the second computer system and the security module can take place over any type of network. This includes a communication via the internet, a communication through wireless network links such as mobile telephony for example, as well as a communication using a carrier frequency system. The latter is also known by the name "powerline data transmission" and includes devices for transmitting data via existing power supply networks. Preferably, this end-to-end encryption also takes place for the communication between the first computer system and the security module.

According to a further embodiment of the invention, the authentication of the second computer system with respect to the security module takes place with the aid of a third certificate of the second computer system. The security module can then check, based on this certificate, whether the second computer system has the necessary authorization for write access to the memory area before such a write access can be carried out by the second computer system.

According to one embodiment of the invention, prior to the initialization of the memory area, successful authentication with respect to the security module is possible only if the third certificate is present. This ensures that in principle only the trustworthy authority in the form of the second computer system is able to start up the device. Manipulations or even espionage attempts on the device are thus suppressed—without initial use of the second computer system and thus of a facility that is trusted by all participants, a communication with the device or with the security module is not possible. Preferably, the security module is enabled for communication with the first computer system only as a result of the storage of the data in the memory area in order to initialize the memory area, wherein the communication with the first computer system is enabled by the data itself that is stored in the memory area. Prior to the initialization of the memory area, therefore, access to the memory area is possible only for the second computer system of the set of computer systems.

According to one embodiment of the invention, the authentication comprises a challenge/response process. Use may be made for example of a cryptographic protocol, for example based on a symmetric key or an asymmetric pair of keys, in order to perform an authentication of the first and/or second computer system with respect to the security module.

According to one embodiment of the invention, a second part of the statement is contained in the second certificate. An acceptance of such a data protection concept is obtained here in particular as a result of the fact that the statements, that is to say the authorizations, are therefore additionally or alternatively contained in an official document, namely a certificate. Since the certificate is forgery-proof and the authenticity thereof can readily be checked by the end consumer, this also allows a particularly high degree of trustworthiness with regard to the specified statements. Preferably, the second certificate is once again signed by the second computer system.

According to one embodiment of the invention, the establishment of the first communication channel takes place by means of the security module, wherein the transmission of the portion of the measurement data elements and/or configuration data specified in the statement takes place by means of a push process. As a result, it is therefore possible that for example the security module establishes the first communication channel at time intervals which are additionally defined in the statement or in general at the time of initialization of the memory area, in order thereby to transmit for example energy consumption values to the first computer system at these time intervals. In this case, it is also possible for example that the first communication channel is established only under certain conditions which are defined at the time of initialization of the memory area. Such conditions may include for example an aggregation of the recorded amounts of energy above a predefined threshold value.

According to a further embodiment of the invention, the data received from the second computer system comprise an energy recording application, wherein the energy recording application was received by the security module with the data from the second computer system. As a result it is possible, at the time of initialization of the memory area by the second computer system, to provide an energy recording application which allows an energy recording and/or energy billing in a manner specified beforehand by for example the metering point operator or the utility company. In addition, such an energy recording application can be used to define how an energy recording is to take place. It may record for example a per-second billing or else a billing with an aggregated energy consumption over a predefined period of time. Furthermore, the energy recording application can also provide an interface via which an end consumer can himself carry out a monitoring of his energy consumption in a predefined manner.

It should be noted at this point that embodiments of the invention are particularly advantageous when the memory area and the security module are contained in a smart meter gateway. In this case, it is possible for example to couple the smart meter gateway to various smart meters so that, during an initialization process, specific energy recording applications and/or configuration data can be provided for each smart meter and optionally per smart meter for various utility companies or metering point operators. This also includes the use once again of the method for initializing the memory area with regard to updating the content of the memory area, for example on account of an update to an energy recording application. Furthermore, this includes the possibility of subsequently adding one or more energy recording applications to the memory area. As a result, by providing one single gateway, an almost unlimited expansion capability is possible using a plurality of different smart meters and the possibility of access control to the gateway for a plurality of different utility companies and/or metering point operators. This is particularly relevant with regard to use for example in apartment buildings in which different subscribers at different times and on different days of the week have defined different utility companies or metering point operators for billing and supplying energy.

The procedure described in relation to the energy recording application can alternatively or additionally be carried out in an analogous manner also in relation to the configuration data and/or the authorization statements themselves. This therefore includes for example an updating of the configuration data by the second computer system and the adding of new configuration data by the second computer system, as well as a changing of the authorization concept by the second computer system. It should be ensured that only the second computer system can change, update or delete the statements.

According to a further embodiment of the invention, the energy recording application initiates the establishment of the first communication channel. As already mentioned above, it is thus possible, particularly at previously defined time intervals, to send a report of the recorded amounts of energy to the utility company and/or metering point operator. This therefore means that the utility company or metering point operator does not need to make a timely enquiry about the recorded energy consumption. If, for example, the energy consumption is reported to the first computer system only when a minimum energy consumption is exceeded, this thus saves the first computer system from making an enquiry which may under some circumstances be superfluous because the total energy consumption has not yet exceeded this threshold value. Nonetheless, it is of course possible for the first computer system to establish communication with the security module at regular intervals, for example when drawing up a final bill, and thus to transfer the measurement data elements from the security module to the first computer system.

According to one embodiment of the invention, the device is a smart meter or a smart meter gateway. In the case of a gateway, this gateway is in turn assigned at least one further smart meter. However, the security module is contained in the gateway.

According to one embodiment of the invention, either the memory area and the security module are contained in the smart meter itself or else the memory area and the security module are contained in a smart meter gateway, wherein the smart meter can be coupled to the smart meter gateway. It is possible for example that the smart meter and the smart meter gateway are coupled to one another via a wireless and/or wired communication link.

In all cases, the memory area serves inter alia to permanently store such data as certificates and cryptographic keys which ensure in a protected manner a reliable and secure data exchange between the end customers operating the smart meters and the utility companies or metering point operators assigned to these smart meters.

Particularly in the case where the memory area is contained in the smart meter gateway, the advantage is obtained that a single central unit can be provided which provides a single central communication interface for any communications with subscribers located outside the smart meter/smart meter gateway network.

According to one embodiment of the invention, the security module has the form of a chip card. By way of example, the security module could be pre-configured in the form of a chip card by the operator of the second computer system, by storing on the chip card that information which makes it possible to allow an authentication of the second computer system with respect to the security module in order to subsequently carry out the initialization process.

According to one embodiment of the invention, the second computer system is an officially certified trust center.

According to a further embodiment of the invention, the security module has a unique identifier, wherein, when the at least a portion of the measurement data elements and/or configuration data specified in the statement are transmitted, the identifier is added to the transmission by the security module. This could have the advantage that it can be defined without doubt for the first computer system that the received measurement data elements and/or configuration data also actually originate from the device. The security module could additionally also sign the identifier with its private key, so that a high degree of protection against forgery is given.

According to one embodiment of the invention, the identifier of the security module is a public key of the security module or an IPv6 address of the security module. The use of the public key of the security module as the identifier of the security module has the advantage that a GUID (Globally Unique Identifier) can thus be provided, which is unique with almost absolutely certain probability. When using the GUID in the form of the public key, the uniqueness could be ensured by simply allocating a public key that is as long as possible. In the case where the identifier of the security module is an IPv6 address, it would easily be possible to perform a unique addressing of the security module via existing networks.

According to a further embodiment of the invention, the first certificate contains the public key of the security module. This public key is assigned to a private key which is stored in a protected memory area in the security module. The certificate may have been created according to a Public Key Infrastructure (PKI) standard, for example according to the X.509 standard.

It should be noted at this point that the described certificates (first, second and third certificate) need not necessarily be stored in a memory of the device provided for this purpose (security module, first computer system, second computer system). As an alternative or in addition, it is also possible that the certificates are stored on a public directory server.

According to one embodiment of the invention, the security module is inseparably connected to the device. Here, "inseparably" will be understood to mean a permanent connection of the security module and device, which ensures that the security module can function. As soon as an attempt is made to remove the security module from the device, the security module enters an unusable, that is to say non-functioning, state. This can be ensured either by an electronic self-destruction, self-deactivation or by a physical destruction or deactivation of the security module. In the simplest case, the security module could be molded into a housing of the device, so that the "breaking-open" of this molded connection leads to the destruction of the security module.

Preferably, a linking process on the device and preferably also on the smart meters assigned to the device is started as a result of the connection of the security module to the device, wherein an inseparable logical link between the security module and the device and the smart meters is established by the linking process. For example, this inseparable logical link comprises an irreversible copying of the first certificate or of the identifier of the security module onto the memory area.

In a further aspect, the invention relates to a computer program product having instructions which can be executed by a processor in order to carry out the method described above.

Hereinbelow, elements which are similar to one another will be denoted by the same reference numbers.

Figure 1:
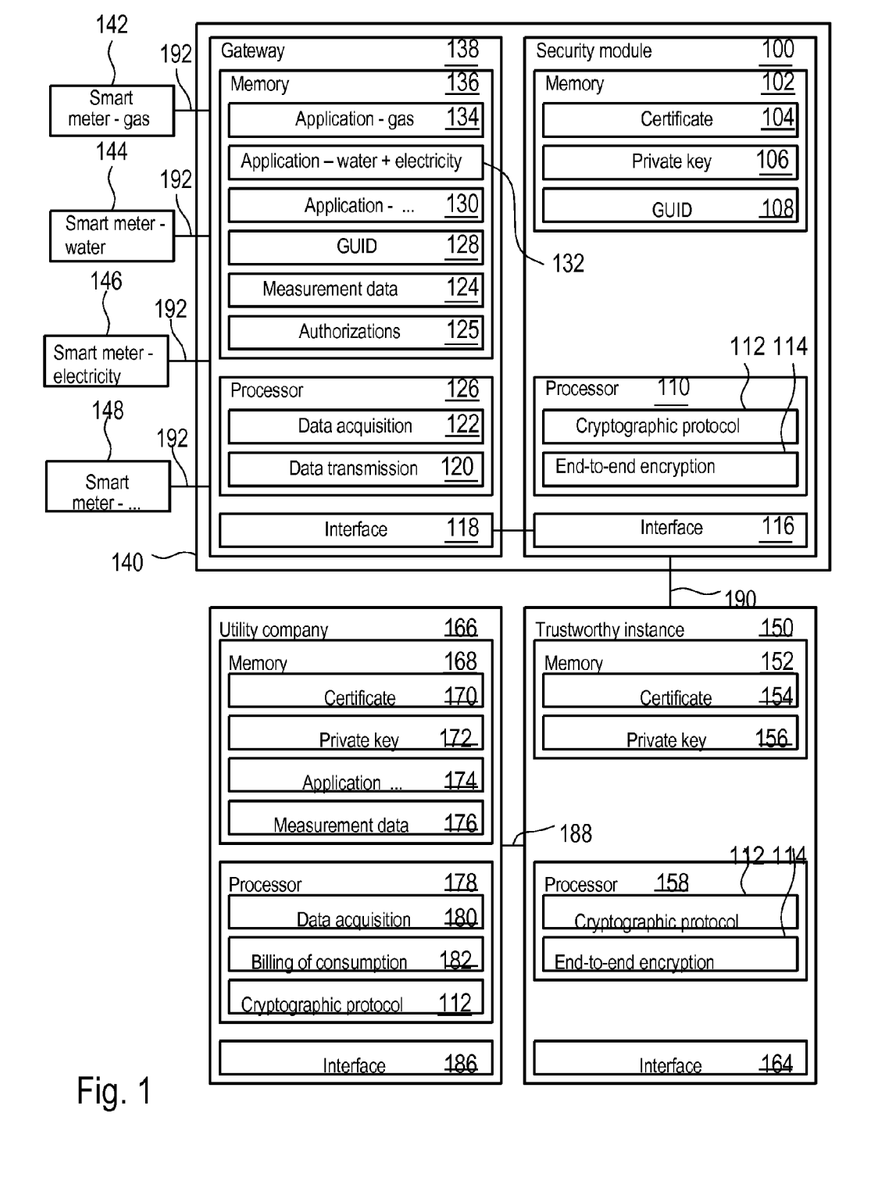
FIG. 1 shows a block diagram of a system for implementing the method described above.

FIG. 1 shows a block diagram of an overall system for initializing a memory area. Together with the method shown in FIG. 2 for initializing a memory area, the following description is intended to show, without limiting the general nature, how a memory area 136 of a gateway 138, which is assigned to a plurality of smart meters 142, 144, 146, 148, can be initialized.

The smart meters 142-148 serve here to record various energy consumption values relating for example to gas (smart meter 142), water (smart meter 144), electricity (smart meter 146) and other forms of energy not specified in any greater detail (smart meter 148). The smart meters are connected to the interface 118 of the gateway 138 via suitable communication links 192.

It should be assumed that a security module 100 is permanently and inseparably connected to the gateway 138 so that overall an inseparable unit 140 is given by the combination of the gateway 138 and the security module 100. The gateway 138 and the security module 100 communicate with one another via respective interfaces 118 and 116. Via the interface 116, a communication also takes place with authorized market operators and third persons or instances that are not located within the network formed by the unit 140 and the smart meters 142-148. The communication between the interface 116 of the security module 100 and further communication participants takes place here via a communication link 190. This may be for example a powerline link or a communication link via a mobile telecommunications network or the internet.

The security module 100 has an electronic memory 102 with protected memory areas 106 and 108. The protected memory area 106 serves for storing a private key of the security module 100, and the memory area 108 serves for storing an identifier of the security module "GUID" (Globally Unique Identifier). The GUID may be for example an IPv6 address of the security module 100.

The electronic memory 102 may furthermore have a memory area 104 for storing a certificate. The certificate contains a public key which is assigned to the private key stored in the protected memory area 106. The certificate may have been created according to a Public Key Infrastructure (PKI) standard, for example according to the X.509 standard.

The certificate need not necessarily be stored by the electronic memory 102 of the security module 100. As an alternative or in addition, the certificate may also be stored in a public directory server.

The security module 100 has a processor 110 for executing program instructions 112 and 114. An authentication of a trustworthy instance 150 or of a utility company 166 with respect to the security module 100 is made possible for example by executing the program instructions 112 "cryptographic protocol". The cryptographic protocol may be for example a challenge/response protocol based on a symmetric key or an asymmetric pair of keys.

Of course, a mutual authentication of security module and trustworthy instance or utility company is also possible.

The program instructions 114 serve for the end-to-end encryption of data that are to be transmitted between the security module 100 and the trustworthy instance 150 or the utility company 166. For the end-to-end encryption, use may be made of a symmetric key which is agreed for example between the security module 100 and the further participants 150 and 166 at the time of carrying out the cryptographic protocol.

Like the security module 100, the trustworthy instance 150 also has an electronic memory 152 and a protected memory area 156 for storing a private key of the trustworthy instance. A certificate 154 of the trustworthy instance may also be contained in the memory 152. However, this certificate may also be stored on a central certificate server.

A processor 158 of the trustworthy instance 150 once again has the program instructions 112 and 114 described above in relation to the security module 100 for implementing a cryptographic protocol and for carrying out an end-to-end encryption. The cryptographic protocol and the end-to-end encryption may be used to communicate via the interface 164 with the utility company 166 or with the security module 100. The certificate 154 once again contains a public key which is assigned to the private key stored in the protected memory area 156.

The "utility company" 166 is a computer system of the utility company, which once again has an electronic memory 168 and a processor 178. This computer system is also assigned an interface 186, via which communication with the trustworthy instance 150 and with the security module is made possible.

The electronic memory 168 of the utility company 166 has a protected memory area 172 containing a private key, wherein the private key is assigned to a public key which is contained in a certificate 170 likewise in the electronic memory 168. Also provided in the memory 168 is a memory area for one or more applications, wherein these applications permit for example a charge-related configuration of the gateway 138. Measurement data 176, which have been previously received from the gateway 138, may also be stored in the electronic memory 168.

The processor 178 has program instructions 180 for recording the consumption data supplied by the gateway 138 and also optionally for carrying out method steps for billing the consumption as a function of the determined measurement data (program instructions 182). The program instructions for carrying out a cryptographic protocol 112 and program instructions (not shown) for carrying out an end-to-end encryption may also be provided, wherein a secure communication with the trustworthy instance 150 and the security module 100 is made possible as a result of these program instructions.

When a new customer is to be assigned to the utility company 166, an initialization process of the security module could take place for example after a first installation of the smart meters 142-148 and after the provision of the gateway 138 with the security module 102. This initialization process could be started as a result of the new customer (an end consumer) or a certain technical instance that installed the smart meters notifying the utility company 166 about this. This notification should preferably include the GUID 108 of the security module 100, since this enables a unique identification of the security module 100 by the utility company 166.

Once the utility company 166 has received this notification via its interface 186, for example via a web interface of a suitable website, the utility company 166 establishes a communication channel to the trustworthy instance 150. This is denoted by reference number 200 in FIG. 2. The trustworthy instance may in this case be for example a so-called "Trusted Service Manager TSM", that is to say an officially certified instance which certifies the respective identify of the communication partner in electronic communication processes.

Figure 2:
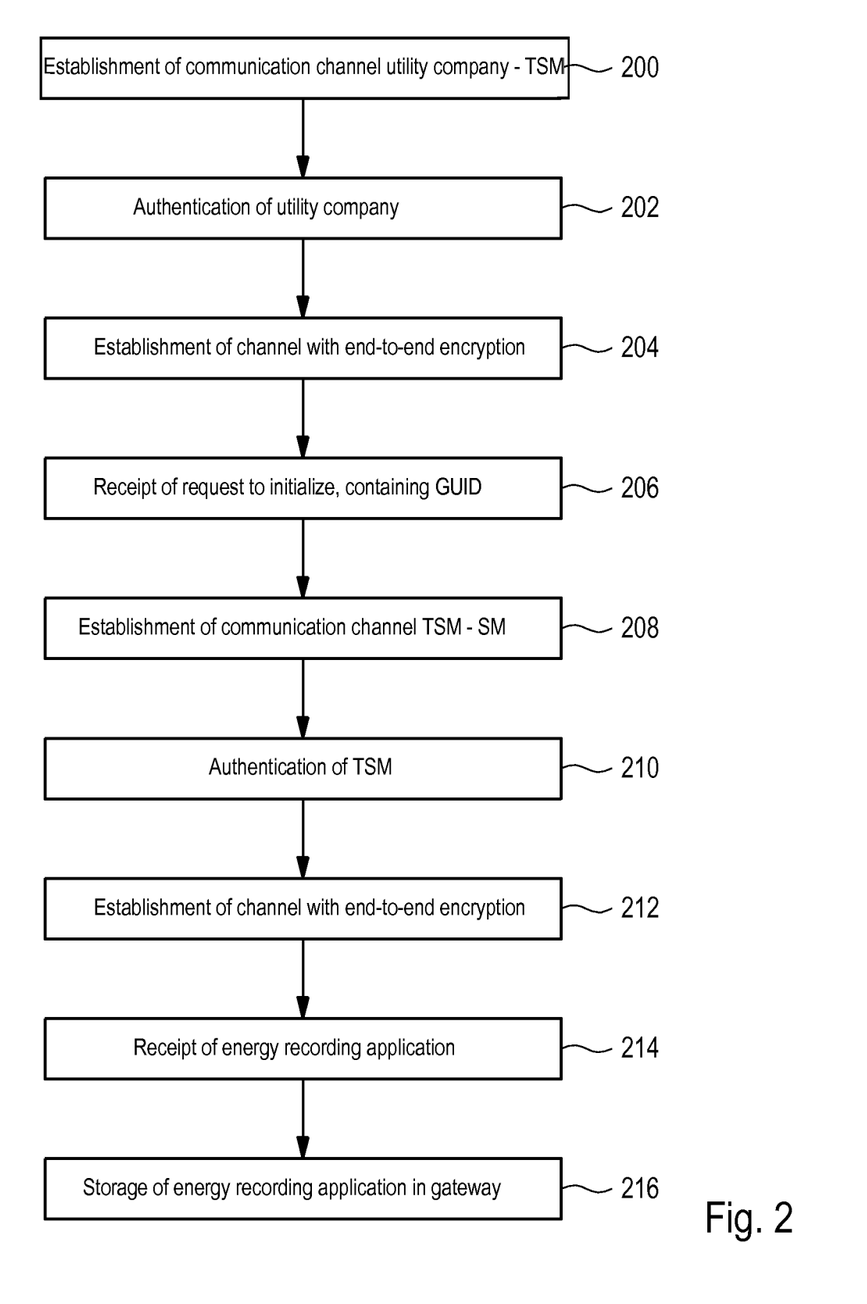
FIG. 2 shows a flowchart of one embodiment of a method for initializing a memory area.

One the communication channel has been established in Block 200, an authentication of the utility company 166 takes place in Block 202. To this end, the certificate 170 of the utility company is checked by the trustworthy instance 150. By way of example, in the event of a positive outcome of the certificate check, the trustworthy instance 150 may carry out a challenge/response process in which a random number is generated, which is encrypted by a public key of the utility company 166, said public key being contained in the certificate 170, and is transmitted to the utility company 166. The utility company 166 can then use its private key 172 to decrypt the random number and send it back in plain text. If the random number now received by the trustworthy instance 150 matches the random number described above, the authenticity of the utility company 166 is in fact verified.

After carrying out the Block 202 and the optional challenge/response process, a channel with end-to-end encryption can then be established in step 204 via the communication link 188 between the utility company 166 and the trustworthy instance 150. For this, use may be made of the program instructions 114 of the processor 158 of the trustworthy instance.

Once the channel has been established in Block 204, the trustworthy instance 150 receives in Block 206 a request to install an energy recording application 174 of the utility company 166 and the memory 136 of the gateway 138. So as uniquely to specify the memory 136 or the gateway 138, the GUID 128 of the gateway 138, which is contained in the memory 136, is also transmitted to the trustworthy instance along with the request to initialize the memory 136. Preferably, the GUID 128 of the memory 136 is identical to the GUID 108 of the memory 102 of the security module 100.

When the GUID is received in Block 206, the trustworthy instance 150 is able uniquely to address the desired gateway 138 to install the application 174. To this end, in a next Block 208, the trustworthy instance 150 establishes a communication channel to the security module 100 via the communication link 190. The trustworthy instance 150 authenticates itself with respect to the security module 100, wherein the authentication comprises, besides a checking of the certificate 154 by the security module, for example once again a challenge/response process by the security module 100. To this end, the security module 100 could once again generate a random number, encrypt it with the public key of the trustworthy instance 150 and send it to the trustworthy instance 150. The trustworthy instance 150 would decrypt the encrypted random number using its private key 156 and would send the decrypted random number back to the security module 100 in plain text. If the security module ascertains that the decrypted random number thus received matches the random number that it originally encrypted, then the trustworthy instance is authenticated.

The method then continues in Block 212, namely the establishment of a communication channel with end-to-end encryption between the trustworthy instance 150 and the security module 100. This may once again take place by using the program instructions 114 of the processor 110 of the security module 100.

In Block 214, the security module 100 receives the energy recording application 174 from the trustworthy instance.

It should be noted at this point that it may be advantageous if for example the trustworthy instance holds a stock of the most frequently sent energy recording applications in a local memory of the trustworthy instance, so that it is not necessary constantly to transmit the applications 174 from the utility company 166 to the trustworthy instance 150 when setting up new customers.

Once the energy recording application has been received in Block 214, the security module 100 stores the application in the memory 136 of the gateway 138. If the application 174 is for example an application for recording energy consumption in relation to water and electricity, then the application is stored as the application 132 in the memory 136. This application is able to process energy consumption data from the smart meter 144. In a manner analogous to this, the memory 136 may comprise corresponding applications for the energy recording of gas (134) and further applications 130 for recording further forms of energy. The storing of the energy recording application by the security module 100 in the gateway 138 is denoted by Block 216 in FIG. 2.

In addition to the receiving of the energy recording application in Block 214 by the security module 100, it is also possible that separate statements in the form of utility company-specific authorizations or precise specifications of measurement data elements are received from the trustworthy instance 150, these likewise being stored in a further area 125 of the memory 136. These authorizations or specifications of measurement data elements make it possible to define in advance which information the utility company 166 is permitted to obtain from the gateway 138. To this end, it is possible for example that specific authorizations are defined in advance for each utility company by the trustworthy instance 150, these being globally applicable to all utility companies 166 and being transmitted in principle with the transmission of energy recording applications to the security module and thus to the gateway 138.

It is also possible that configuration data are obtained from the trustworthy instance 150. These configuration data may relate to the technical configuration of the smart meters and/or the gateway.

Instead of or in addition to these authorizations or specifications in the form of a separate statement, it is also possible to implement these authorizations or specifications in the energy recording application itself. The application thus automatically checks, on the basis of its program instructions, which data will be communicated to the utility company 166.

By means of the program instructions for data acquisition 122 of the processor 126, the gateway 138 is now able to acquire measurement data relating to an energy consumption for example from the smart meter 144 and the smart meter 146. The measurement data in question are stored in the memory area 124 of the memory 136. In principle, the measurement data 124 consist of various measurement data elements which may include for example: the time of recording of the measurement data, individual measurement data points at the time in question, information regarding the occurrence of the measurement data (for example current intensity, voltage, water pressure, water temperature, gas pressure). The measurement data 124 may be subjected to further analysis via the applications 130, 132 and 134, resulting in analyzed measurement data which can likewise be stored as "measurement data elements" in the memory area 124. By way of example, the analyzed measurement data may be accumulated energy consumption values.

The authorizations 125 described above or the specifications of the measurement data elements make it possible to define from the outset which of these measurement data elements 124 may be retrieved by the utility company 126 or which of these measurement data elements 124 are to be transmitted at all to the utility company 126. This also makes it possible to define from the outset how detailed such a communication is allowed to be. An excessively detailed and time-accurate retrieval of the measurement data 124 might be undesirable for example since knowledge about the use of electronic devices can be obtained by short time intervals between measurements and thus user profiles can be created, even though an end customer might have no interest at all in this.

With regard to the flowchart of FIG. 3 and the assumption that measurement data 124 have been acquired by the gateway 138, it will now be described below how the measurement data can be transmitted to the utility company 166 for final billing purposes. Without limiting the general nature, it will be assumed below that the utility company 166 performs the "reading", that is to say the acquisition of the measurement data contained in the memory 136. However, it is also possible that the utility company 166 appoints a so-called metering point operator to do this. A metering point operator in this case is a computer system which on behalf of the utility company 166 acquires the measurement data contained in the gateway 138. The steps described below, which are carried out by the utility company 166, apply analogously in the case where the utility company 166 is replaced by such a metering point operator.

In step 300, the gateway 138 initiates the establishment of a communication channel to the utility company 166, wherein the actual establishment of the communication channel is performed by the security module 100. For this, the gateway 138 and the security module 100 communicate via their respective interfaces 118 and 116. In step 302, a mutual authentication of the security module 100 and the utility company 166 takes place via the network 190, for example the internet or a powerline link. To this end, a mutual certificate check can once again be carried out using the certificates 104 and 170. In addition, it is also optionally possible for a challenge/response process to be carried out between the security module 100 and the utility company 166.

The establishment of the communication channel may be initiated for example by the module 120. Alternatively, it is possible that the application 130, 132 or 134 initiates the establishment of the communication channel.

After successful mutual authentication, in step 304 a communication channel with end-to-end encryption is established, preferably initiated by the program instruction 114 of the security module 100. The utility company 166 receives in step 306 the GUID 108 of the security module, which preferably matches the GUID 128 of the gateway. Based on the GUID 108, the utility company 166 is able to assign the measurement data that are to be received to the correct gateway and thus to the correct end consumer. The GUID may be signed by the security module.

In step 308, the measurement data elements are received by the utility company 166. Step 308 is then broken down in turn into an optional number of further steps 310 to 318. For example, in step 310, the attributes, that is to say the authorizations 125, are read from the memory 136 by the security module 100 in order to ascertain which measurement data elements are even to be transmitted to the utility company 166. The authorizations may be notified to the security module 100 by the initialization process described above. As an alternative or in addition, it is also possible that the authorizations are contained in a certificate which is received by the security module from the utility company 166. Since the certificate has been created by the trustworthy instance 150, it is ensured that the security module 100 and thus the gateway 138 can trust the authorization details contained therein.

It should be noted that here, instead of or in addition to the measurement data elements, configuration data may also be transmitted to the utility company 166 in an analogous manner.

If no specific attributes were requested by the utility company 166 with the mutual communication that has just taken place, step 312 decides that a predefined portion of the measurement data elements specified by the attributes will be generally transmitted to the utility company 166 in step 318. If, on the other hand, a specific attribute was requested by the utility company in the course of the communication, then in step 314 a check is carried out as to whether the reading of such an attribute, that is to say of such a measurement data element, by the utility company is permitted. If this is not the case, the method is terminated in step 316 and an error report is issued to the utility company 166. If, on the other hand, the reading of the attribute is permitted, then the measurement data elements specified by this requested attribute are transmitted in step 318.

The requesting of specific measurement data elements by the utility company 166 could be relevant when for example the utility company has a plurality of authorizations for reading information from the gateway but does not wish to make use of all its authorizations in the course of a simple customary energy consumption billing. For instance, the specified measurement data elements could also contain information about the proper functioning of the gateway or of the connected smart meters, the utility company 166 during normal operation not being at all interested in this information, which is more suited to diagnostic purposes. In this case, the utility company 166 would request only the data which are also actually relevant for billing an energy consumption.

The data transmission from the gateway 138 via the security module 100 to the utility company 166 takes place by means of program instructions 120 of the processor 126.

Figure 3:
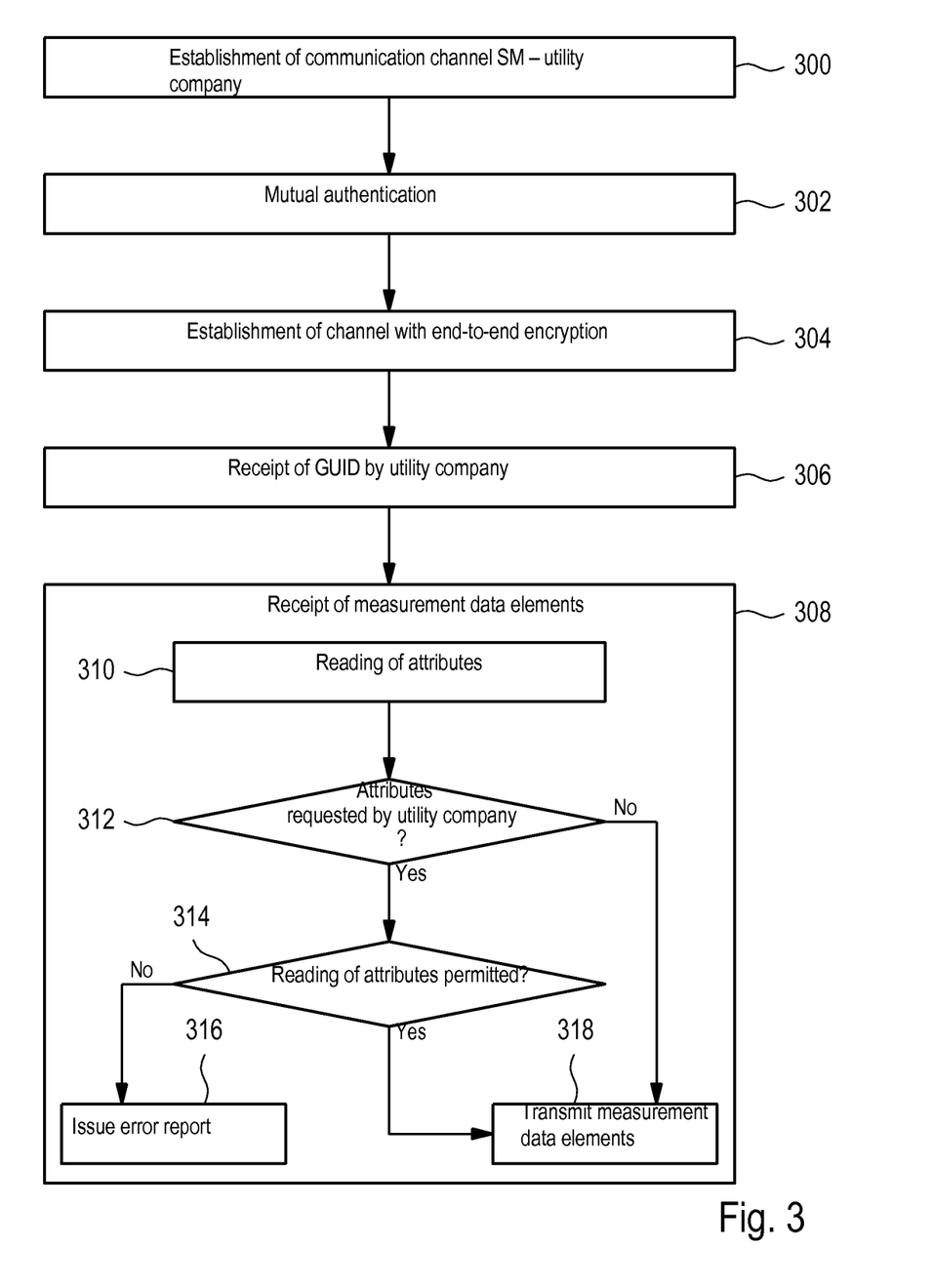
FIG. 3 shows a flowchart of a method for receiving or retrieving measurement data elements.

With regard to FIG. 3, it should be noted that it has been assumed here that the establishment of the communication channel by the gateway 138 took place using the security module. For example, one of the applications 130-134 initiated the establishment of the communication channel as a result of, for example, the expiry of a suitable timer.

However, it is also possible that the utility company 166 initiates on its own initiative a communication with the gateway 138 via the security module 100. In this case, therefore, there is an active request for the measurement data 144 by the utility company 166.

A method for communicating energy consumption-specific measurement data elements recorded by a smart meter between a smart meter device and a first computer system of a utility company and/or operator of a measuring system, the device having a security module, said security module serving as the sole communication interface between of the device with the first computer system, the device having configuration data required for its operation, and the device being associated with an indication of those measurement data elements and/or configuration data for which the first computer system has a read access authorization, the method comprising: establishing a first communication channel between the first computer system and the security module, mutually authenticating the computer system and the security module, authentication being carried out with the aid of a first certificate of the security module and a second certificate of the first computer system; once mutual authentication has been completed, transmitting via the security module at least a part of the measurement data elements and/or configuration data specified in the indication to the first computer system by a secured transmission.

Some aspects and features of the disclosed embodiments are set out in the following numbered items:

1. A method for communicating energy consumption-specific measurement data elements recorded by a smart meter (142; 144; 146; 148) from a smart meter device (138; 142; 144; 146; 148) to a first computer system (166) of a utility company and/or metering point operator, wherein the device (138; 142; 144; 146; 148) has a security module (100), wherein the security module (100) serves as the sole communication interface between the device (138; 142; 144; 146; 148) and the first computer system (166), wherein the device has configuration data necessary for its operation, wherein the device is assigned a statement (125) of those measurement data elements and/or configuration data for which the first computer system (166) has a read access authorization, wherein the method comprises: establishing a first communication channel between the first computer system (166) and the security module (100), mutually authenticating the computer system (166) and the security module (100), wherein the authentication takes place with the aid of a first certificate (104) of the security module (100) and with the aid of a second certificate of the first computer system (166), after successful mutual authentication, transmitting at least a portion of the measurement data elements and/or configuration data specified in the statement (125) to the first computer system (166), via the security module (100), by a secure transmission.

2. The method according to claim 1, wherein the device has a memory area (136), wherein a first part of the statement (125) is stored in the memory area.

3. The method according to claim 2, further comprising the steps establishing a second communication channel between a second computer system (150) and the security module (100), wherein the first computer system (166) and the second computer system (150) are assigned to a set of computer systems connected via a network, authenticating the second computer system (150) with respect to the security module (100), wherein the initialization serves to enable a communication of the security module (100) with the first computer system (166), wherein, prior to the initialization of the memory area (136), a successful authentication with respect to the security module (100) is possible only for the second computer system (150) of the set of computer systems, after successful authentication of the second computer system (150) with respect to the security module (100), receiving of data from the second computer system (150) by the security module (100) through a secure transmission and storing the data in the memory area (136) in order to initialize the memory area (136), wherein the communication between the first computer system (166) and the security module (100) while bypassing the second computer system (150) is enabled only as a result of the stored data.

4. The method according to claim 3, wherein the stored data comprise the first part of the statement (125).

5. The method according to claim 3 or 4, wherein the secure transmission takes place through an end-to-end encryption between the second computer system (150) and the security module (100).

6. The method according to any of the preceding claims 3 to 5, wherein the authentication of the second computer system (150) with respect to the security module (100) takes place with the aid of a third certificate (154) of the second computer system (150).

7. The method according to claim 6, wherein, prior to the initialization of the memory area (136), successful authentication with respect to the security module (100) is possible only if the third certificate (154) is present.

8. The method according to any of the preceding claims 3 to 7, wherein the security module is enabled for communication with the first computer system (166) only as a result of the storage of the data in the memory area (136) in order to initialize the memory area (136), wherein the communication with the first computer system (166) is enabled by the data itself that is stored in the memory area.

9. The method according to any of the preceding claims 3 to 8, wherein, prior to the initialization of the memory area (136), write access to the memory area (136) is possible only for the second computer system (150) of the set of computer systems.

10. The method according to any of the preceding claims, wherein the authentication of the first and/or second computer system comprises a challenge/response process.

11. The method according to any of the preceding claims, wherein a second part of the statement (125) is contained in the second certificate.

12. The method according to any of the preceding claims 3 to 11, wherein the second certificate is signed by the second computer system (150).

13. The method according to any of the preceding claims, wherein the establishment of the first communication channel takes place by means of the security module (100), wherein the transmission of the portion of the measurement data elements and/or configuration data specified in the statement (125) takes place by means of a push process.

14. The method according to any of the preceding claims, wherein the device has an energy recording application (130; 132; 134; 174).

15. The method according to claim 14, wherein the device is assigned the statement (125) in the form of the energy recording application (130; 132; 134; 174), wherein the energy recording application (130; 132; 134; 174) monitors the access of the first computer system (166) to the measurement data elements and/or configuration data based on the statement (125).

16. The method according to claim 14 or 15, wherein the energy recording application (130; 132; 134; 174) initiates the establishment of the first communication channel.

17. The method according to any of the preceding claims 3 to 16, wherein the data stored in the memory area (136) comprise the energy recording application (130; 132; 134; 174), wherein the energy recording application (130; 132; 134; 174) was received by the security module (100) with the data from the second computer system (150).

18. The method according to any of the preceding claims, wherein the security module (100) has the form of a chip card.

19. The method according to any of the preceding claims, wherein the device is a smart meter or a smart meter gateway.

20. The method according to any of the preceding claims, wherein the security module (100) has an identifier (108; 128), wherein, when the at least a portion of the measurement data elements and/or configuration data specified in the statement (125) are transmitted, the identifier (108; 128) is added to the transmission by the security module (100).

21. A computer program product having instructions which can be executed by a processor in order to carry out the method steps according to any of the preceding claims.

LIST OF REFERENCE NUMBERS 100 security module
102 memory
104 certificate
106 private key
108 GUID
110 processor
112 cryptographic protocol
114 end-to-end encryption
116 interface
118 interface
120 data transmission
122 data acquisition
124 measurement data
125 authorization
126 processor
128 GUID
130 application
132 application 134 application
136 memory
138 memory
140 unit
142 smart meter
144 smart meter
146 smart meter
148 smart meter
150 trustworthy instance
154 certificate
156 private key
158 processor
164 interface
166 utility company
168 memory
170 certificate
172 private key
174 application
176 measurement data
178 processor
180 data acquisition
182 billing of consumption
186 interface
188 communication link
190 communication link
192 communication link

What is claimed is:

1. A method for communicating energy consumption-specific measurement data elements recorded by a smart meter from a smart meter device to a first computer system of a utility company and/or metering point operator, wherein the device has a security module, wherein the security module comprises a unique identifier and serves as the sole communication interface between the device and the first computer system, wherein the device has configuration data necessary for its operation, wherein the device is assigned a statement of those measurement data elements and/or configuration data for which the first computer system has a read access authorization, wherein a first part of the statement is stored in a memory area of the device, and wherein the method comprises:

initializing the smart meter device;
establishing a first communication channel between the first computer system and the security module;
mutually authenticating the computer system and the security module, wherein the authentication takes place with the aid of a first certificate of the security module and with the aid of a second certificate of the first computer system; and
after successful mutual authentication, transmitting at least a portion of the measurement data elements and/or configuration data specified in the statement to the first computer system, via the security module, by a secure transmission;

where initializing the smart meter device comprises:
establishing a second communication channel between the first computer system and a second computer system, wherein the first computer system and the second computer system are assigned to a set of computer systems connected via a network;
authenticating the first computer system with respect to the second computer system;
after successful authentication of the first computer system with respect to the second computer system, receiving data and the unique identifier of the security module from the first computer system, via a secure transmission, by the second computer system;
assigning the unique identifier to the associated security module by the second computer system;
establishing a third communication channel between the second computer system and the security module;
authenticating the second computer system with respect to the security module, wherein the initialization serves to enable a communication of the security module with the first computer system, wherein, prior to the initialization of the memory area, a successful authentication with respect to the security module is possible only for the second computer system of the set of computer systems; and
after successful authentication of the second computer system with respect to the security module, receiving of data from the second computer system by the security module through a secure transmission and storing the data in the memory area in order to initialize the memory area, wherein the communication between the first computer system and the security module while bypassing the second computer system is enabled only as a result of the stored data,
wherein the stored data comprise the first part of the statement and an energy recording application, wherein the second computer system is a computer system of a trustworthy instance, wherein the initialization is triggered by the transmission of the identifier of the security module to the first computer system.

2. The method according to claim 1, wherein the security module is enabled for communication with the first computer system only as a result of the storage of the data in the memory area in order to initialize the memory area, wherein the communication with the first computer system is enabled by the data itself that is stored in the memory area.

3. The method according to claim 1, wherein, prior to the initialization of the memory area, write access to the memory area is possible only for the second computer system of the set of computer systems.

4. The method according to claim 1, wherein the authentication of the first and/or second computer system comprises a challenge/response process.

5. The method according to claim 1, wherein a second part of the statement is contained in the second certificate.

6. The method according to claim 1, wherein the establishment of the first communication channel takes place by way of the security module, wherein the transmission of the portion of the measurement data elements and/or configuration data specified in the statement takes place by way of a push process.

7. The method according to claim 1, wherein the device has an energy recording application.

8. The method according to claim 7, wherein the device is assigned the statement in the form of the energy recording application, wherein the energy recording application monitors the access of the first computer system to the measurement data elements and/or configuration data based on the statement.

9. The method according to claim 7, wherein the energy recording application initiates the establishment of the first communication channel.

10. The method according to claim 1, wherein the security module has the form of a chip card.

11. The method according claim 1, wherein the device is a smart meter or a smart meter gateway.

12. The method according to claim 1, wherein the security module has an identifier, wherein, when the at least a portion of the measurement data elements and/or configuration data specified in the statement are transmitted, the identifier is added to the transmission by the security module.

13. A method for initializing the smart meter device to enable communication of energy consumption-specific measurement data elements recorded by a smart meter from the smart meter device to a first computer system of a utility company and/or metering point operator, wherein the device has a security module, wherein the security module comprises a unique identifier and serves as the sole communication interface between the device and the first computer system, wherein the device has configuration data necessary for its operation, wherein the device is assigned a statement of those measurement data elements and/or configuration data for which the first computer system has a read access authorization, wherein a first part of the statement is stored in a memory area of the device, the method comprising:

establishing a second communication channel between the first computer system and a second computer system, wherein the first computer system and the second computer system are assigned to a set of computer systems connected via a network;

authenticating the first computer system with respect to the second computer system;

after successful authentication of the first computer system with respect to the second computer system, receiving data and the unique identifier of the security module from the first computer system, via a secure transmission, by the second computer system;

assigning the unique identifier to the associated security module by the second computer system;

establishing a third communication channel between the second computer system and the security module;

authenticating the second computer system with respect to the security module, wherein the initialization serves to enable a communication of the security module with the first computer system, wherein, prior to the initialization of the memory area, a successful authentication with respect to the security module is possible only for the second computer system of the set of computer systems; and after successful authentication of the second computer system with respect to the security module, receiving of data from the second computer system by the security module through a secure transmission and storing the data in the memory area in order to initialize the memory area, wherein the communication between the first computer system and the security module while bypassing the second computer system is enabled only as a result of the stored data wherein the stored data comprise the first part of the statement and an energy recording application, wherein the second computer system is a computer system of a trustworthy instance, wherein the initialization is triggered by the transmission of the identifier of the security module to the first computer system.

14. The method according to claim 13, wherein the secure transmission takes place through an end-to-end encryption between the second computer system and the security module.

15. The method according to claim 13, wherein the authentication of the second computer system with respect to the security module takes place with the aid of a third certificate of the second computer system.

16. The method according to claim 15, wherein, prior to the initialization of the memory area, successful authentication with respect to the security module is possible only if the third certificate is present.

17. The method according to claim 13, wherein the second certificate is signed by the second computer system.

18. The method according to claim 13, wherein the data stored in the memory area comprise the energy recording application, wherein the energy recording application was received by the security module with the data from the second computer system.

* * * * *